Aug. 7, 1945.  E. ADAMS  2,381,417
HELICOPTER
Filed Nov. 27, 1943  2 Sheets-Sheet 1
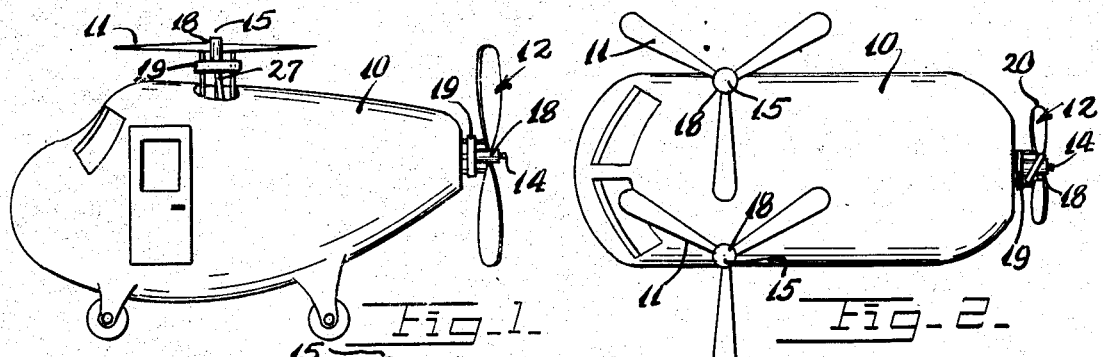
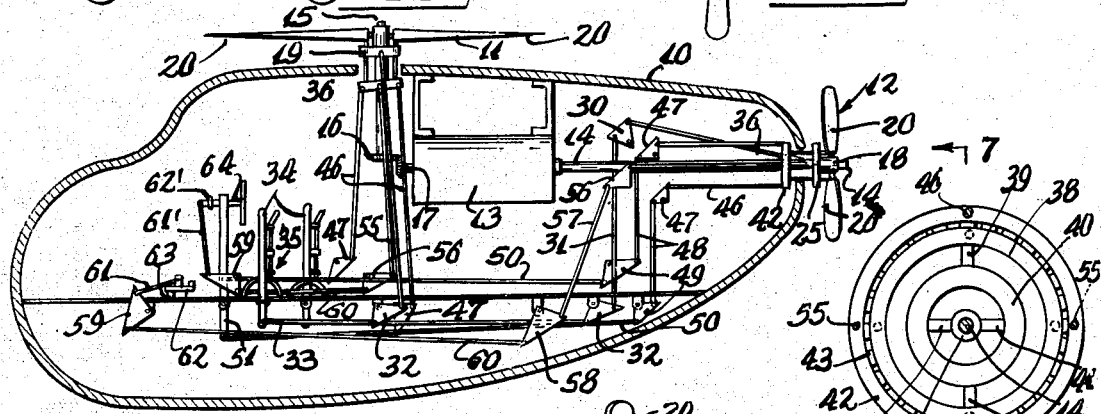
INVENTOR.
Eugene Adams
BY
ATTORNEY Aug. 7, 1945.  E. ADAMS  2,381,417
HELICOPTER
Filed Nov. 27, 1943  2 Sheets-Sheet 2
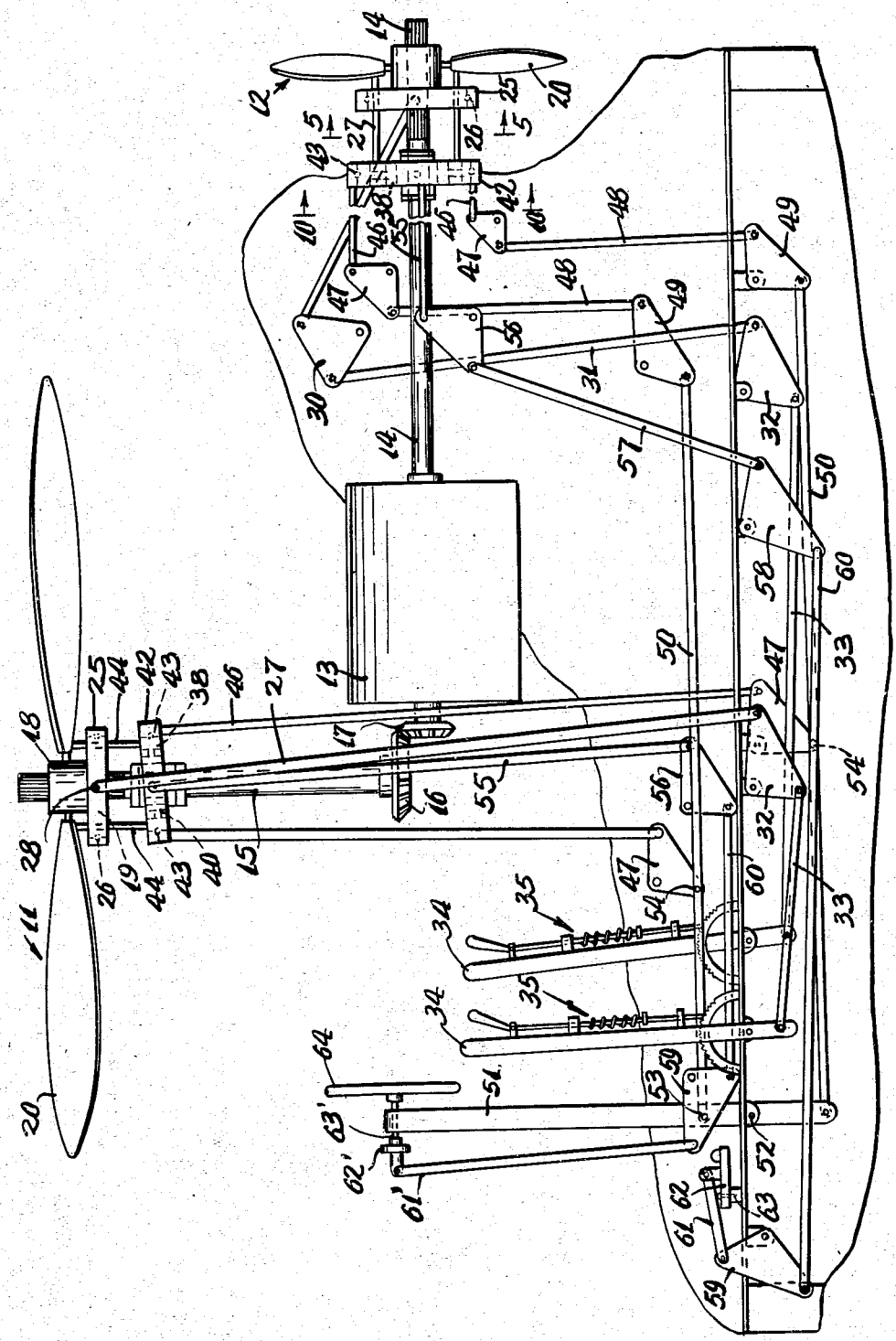
Fig-4-
INVENTOR.
Eugene Adams
BY
ATTORNEY Patented Aug. 7, 1945

2,381,417

UNITED STATES PATENT OFFICE 2,381,417

HELICOPTER

Eugene Adams, Newark, N. J.

Application November 27, 1943, Serial No. 511,907

7 Claims. (Cl. 244—17)

This invention relates to new and useful improvements in a helicopter.

More specifically, the invention proposes the construction of a helicopter provided with overhead propellers for lifting the helicopter and a back propeller for driving the helicopter forward with the blades of the propellers being adjustable in pitch in unison or relative to each other in a manner to cooperate to accomplish steering of the helicopter.

Still another object of the invention proposes the provision of a novel arrangement between the propeller blades and the portion of the aircraft occupied by the pilot whereby the pilot will have at his disposal levers for accomplishing the movement of the propeller blades.

It is a further object of this invention to provide a novel connection between the propeller blades and the levers wherein the levers remain non-rotative and in no way interfere with the propellers which are mounted upon a shaft arranged to be rotated by the motor.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a side elevational view of a helicopter constructed in accordance with this invention.

Fig. 2 is a plan view of Fig. 1.

Fig. 3 is a longitudinal vertical sectional view of a portion of Fig. 3.

Fig. 4 is an enlarged detailed view of a portion of Fig. 3.

Fig. 5 is an enlarged vertical sectional view taken on the line 5—5 of Fig. 4.

Fig. 6 is an enlarged vertical sectional view taken on the line 6—6 of Fig. 4.

Fig. 7 is an enlarged vertical sectional view taken on the line 7—7 of Fig. 6.

Fig. 8 is a partial vertical sectional view through the hub of one of the propellers.

Fig. 9 is a plan view similar to Fig. 2 but illustrating a modification of the invention.

The helicopter, in accordance with this invention, includes a body 10 of any desired design and construction and which is provided with one or more driven overhead propellers 11 for lifting the helicopter, and a rear propeller 12 for driving the helicopter in a forward direction. Each of the propellers is arranged to be driven by a motor 13. The propeller 12 is mounted directly upon the driven shaft 14 of the motor 13. The overhead propellers 11 which are arranged laterally of each other are mounted upon vertical shafts 15 provided at their inner or bottom ends with bevel gears 16. These bevel gears 16 mesh with a bevel gear 17 mounted on the other end of the driven shaft 14. The motor 13 is suspended from an interior portion of the helicopter body 10 and is the source of energy for driving all the propellers.

Means is provided for controlling the pitch of the propellers 11 and 12 and this means is alike for all the propellers. Therefore the description of this adjusting means will be taken up in detail in regard to one of the propellers, and each of the others is similarly constructed.

The means for adjusting the pitch of the propellers 11 is characterized by a propeller hub 18 which is keyed and slidably mounted upon its respective driven propeller shaft. The back of the propeller hub is provided with a radially extending flange 19. Each of the blades 20 of the propeller is provided with an inwardly extending trunnion 21 provided at its end with a plate 22 disposed within an opening 23 formed in the hub 18. Bearings 24 are disposed between the plate 22 and a portion of the opening 23 housing the blade 20 so that it may be easily turned. An annular rotative member 25 is rotatively but non-slidably mounted on the back flange 19. This rotative but non-slidable mounting is accomplished by the provision of ball bearings 26 between the adjacent surfaces of the flange 19 and the annular member 25. The provision of the bearings 26 permits the hub 18 and flange 19 to rotate freely with the driven propeller shaft, while the annular member 25 remains stationary.

Means is connected with the annular member 25 for adjusting the hub 18 in various longitudinal slid positions upon the driven propeller shaft. This means comprises a link 27 pivotally attached at one end by means of a pin 28 to the annular member 25. The link 27 in turn connects with a bell crank 30 which is pivotally attached to the end of a link 31 attached to a second bell crank 32. The bell crank 32 is connected with still another link 33 which has its end pivotally attached to a vertically pivotally supported handle 34. The handle 34 is disposed at a position within the body 10 to be easily reached by the pilot. A suitable brake mechanism 35 is provided in connection with the handle 34 for holding it in various pivoted positions to maintain the hub 18 in its various adjusted positions upon its driven propeller shaft.

A wheel 36 is mounted on the driven propeller shaft at a point back of the back flange 19 of the hub 18. The wheel 36 comprises a hub 37 which is pinned to the driven propeller shaft to rotate therewith. A rim portion 38, making a portion of the wheel 36, is provided with a pair of oppositely disposed inwardly extended trunnion elements 39 which are pivotally connected to an inner rim portion 40. The inner rim portion 40 is in turn provided with a pair of inwardly directed oppositely disposed trunnion elements 41 which are pivotally connected to the hub 37. The trunnion elements 41 are projected in a line at right angles to the axis of the trunnion elements 39 and cooperate with the trunnion elements 39 to universally support the rim portion 38 upon the hub 37.

A second annular member 42 is rotatively supported upon the outer rim portion 38 of the wheel 36. This rotative supporting of the second annular member 42 is also accomplished by the provision of ball bearings 36 disposed within races formed in the adjacent faces of the rim portion 38 of the wheel 36 and the second annular member 42. A group of flexible links 44 extend from the face of the rim portion 38 of the wheel 36 and are slidably extended through passages formed in the back flange 19 of the hub 18, as shown in Fig. 8. The free ends of the links 44 are pivotally connected to one of the edge portions of the propeller blades 20 by means of pins 45. Thus there is one link 44 on the rim portion 38 of the wheel 36 for each of the propeller blades 20.

Means is connected with the second annular member 42 for tilting the rim portion 38 of the wheel 36 universally about the hub 37 to change the pitch of the blades 20 independently of each other as they rotate about the axis of the driven propeller shaft. This means comprises rods 46 which are connected to diametrically opposite sides of the annular member 42, preferably at the top and bottom thereof. These links 46 in turn connect with bell cranks 47 connected with links 46 connected with a second group of bell cranks 49. These bell cranks 49 are connected by means of links 50 with portions of a pivotal lever 51 arranged within the helicopter body 10 at the disposal of the pilot.

The lever 51 is pivotally supported adjacent its bottom upon a pin 52 and the ends of the links 50 are pivotally connected with the lever 51 by means of pins 53 at points above and below the pivot point 52 of the lever 51. Thus when the lever 51 is tilted in one direction or the other certain of the links 50 will be pulled while the others are slackened to tilt the rim portion 38 about the horizontal trunnion elements 41. A similar motion will be imparted to the rods 44 as the rim portion 38 rotates within the annular member 42 and with the driven propeller shaft.

The links 50 of the back propeller 12 are connected with the lever 51. The links 50 of the overhead propellers 11 are connected with the links 50 at points 54.

A second set of links 55 are connected with the horizontally disposed opposite sides of the second annular member 42 and connect with bell cranks 56, in turn connected with links 57. The links 57 in turn are connected with still other bell cranks 58 which are connected with bell cranks 59 by means of links 60. The bell cranks 59 have links 61 connected therewith which are in turn connected with the ends of a foot lever 62 pivotally supported upon a pin 63 intermediate of its ends upon the floor of the helicopter body 10. This lever 62 is adapted to be pivoted in one direction or the other by the pilot's feet for imparting a pulling and slackening motion upon the links 61 to be transferred to the annular member 42 through the other links and bell cranks to cause the annular member 42 and the rim portion 38 of the wheel 36 to be pivoted about the vertical trunnion elements 39. A similar motion will be imparted to the rods 44 through its slidable engagement with the bottom flange 19 of the hub 18 to slightly twist the propeller blades 20.

The links 61' of the topmost propellers 11 are connected to the ends of an arm 62' fixedly attached to a pin 63' mounted on the top end of the lever 51. The pin 63' carrying the lever 62' is adapted to be manually turned by the pilot through the medium of a wheel 64 mounted upon the free end of the pin 63'.

The manner of operating the helicopter, in accordance with this invention is as follows:

The pilot is provided with the usual controls for operating the motor 13. However, these controls are not shown on the drawings since they form no part of the invention. The pilot sets the motor 13 in operation to rotate the propellers 11 and 12 to raise the helicopter off the ground and impart a forward motion thereto.

The pitch of the propeller blades 20 may be adjusted in unison relative to each other through the medium of the levers 34. This is accomplished by squeezing the handles on the ends of the levers 34 together to release the brake mechanisms 35 and free the handles to be pivoted. Pivoting the handle 34 will ultimately move the links 27 and move the first annular members 25 forwards or rearwards. Since these annular members are rotatively but non-slidably connected with the rear flanges of the hubs 18, they will similarly slide the hubs upon the driven propeller shafts. The flexible links 44 which extend from the rim portions 38 of the wheel 36 will remain stationary and the connection of the blades 20 with these links will cause their pitch to be varied in unison as the hub 18 slides back and forth upon the driven propeller shaft.

It is also possible to initially adjust the pitch of the propeller blades 20 relative to each other as they rotate about the axis of the driven propeller shafts. This adjustment is particularly useful when steering the helicopter on turns. This is accomplished by tilting the second annular members 42 universally about the trunnion elements 39 and 41 through the medium of the previously described links to similarly tilt the rim portion 38 of the wheel 36. The connection of the rim portion 38 with the propeller blades 20 through the medium of the flexible links 44 will cause the blades to be pivoted to and fro as the propeller hub 18 is rotated relative to the angular adjusted positions of the rim portion 38'.

In the modification of the invention shown in Fig. 9, the helicopter body 10' is in the form of a bus or transport vehicle which has its overhead propellers 11' arranged one back of the other. In other respects this form of the invention is similar to that previously shown and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a helicopter, driving and steering mechanism, comprising a driven propeller shaft, a propeller hub having a back flange, being keyed and slidably mounted on said driven propeller shaft, a plurality of propeller blades swivelly mounted on said propeller hub for variable pitch adjustments, an annular member rotatively and non-slidably mounted on said back flange, means connected with said annular member for adjusting said propeller hub slidably upon said propeller shaft, a wheel located back of said back flange and having a hub portion fixedly mounted on said propeller shaft and a rim portion universally mounted on said hub portion, a second annular member rotatively and non-slidably mounted on said rim portion of said wheel, a group of flexible links connected with said rim portion and slidably passing through said back flange and connected with said propeller blades for varying the pitches of said blades in accordance with the tilted positions of said rim portion, and means connected with said second annular member for tilting said rim portion.

2. In a helicopter, driving and steering mechanism, comprising a driven propeller shaft, a propeller hub having a back flange, being keyed and slidably mounted on said driven propeller shaft, a plurality of propeller blades swivelly mounted on said propeller hub for variable pitch adjustments, an annular member rotatively mounted on said back flange, means connected with said annular member for adjusting said annular member to various positions for adjusting said propeller hub slidably upon said propeller shaft, a wheel located back of said back flange and having a hub portion fixedly mounted on said propeller shaft and a rim portion universally mounted on said hub portion, a second annular member rotatively mounted on said rim portion of said wheel, a group of flexible links connected with said rim portion and slidably passing through said back flange and connected with said propeller blades for varying the pitches of said blades in accordance with the tilted positions of said rim portion, and means connected with said second annular member for tilting said rim portion, said rim portion of said wheel being universally mounted by reason of being pivotally supported on trunnion elements to an inner rim portion which in turn is pivotally supported on trunnion elements arranged at right angles to said first mentioned trunnion elements and upon said hub.

3. In a helicopter, driving and steering mechanism, comprising a driven propeller shaft, a propeller hub having a back flange, being keyed and slidably mounted on said driven propeller shaft, a plurality of propeller blades swivelly mounted on said propeller hub for variable pitch adjustments, an annular member rotatively mounted on said back flange, means connected with said annular member for adjusting said annular member to various positions for adjusting said propeller hub slidably upon said propeller shaft, a wheel located back of said back flange and having a hub portion fixedly mounted on said propeller shaft and a rim portion universally mounted on said hub portion, a second annular member rotatively mounted on said rim portion of said wheel, a group of flexible links connected with said rim portion and slidably passing through said back flange and connected with said propeller blades for varying the pitches of said blades in accordance with the tilted positions of said rim portion, and means connected with said second annular member for tilting said rim portion, each of said annular members being rotatively but non-slidably supported by reason of ball bearings engaged within races formed partially within their faces and the faces upon which they are supported.

4. In a helicopter, driving and steering mechanism, comprising a driven propeller shaft, a propeller hub having a back flange, being keyed and slidably mounted on said driven propeller shaft, a plurality of propeller blades swivelly mounted on said propeller hub for variable pitch adjustments, an annular member rotatively mounted on said back flange, means connected with said annular member for adjusting said annular member to various positions for adjusting said propeller hub slidably upon said propeller shaft, a wheel located back of said back flange and having a hub portion fixedly mounted on said propeller shaft and a rim portion universally mounted on said hub portion, a second annular member rotatively mounted on said rim portion of said wheel, a group of flexible links connected with said rim portion and slidably passing through said back flange and connected with said propeller blades for varying the pitches of said blades in accordance with the tilted positions of said rim portion, and means connected with said second annular member for tilting said rim portion, said first mentioned means comprising a link pivotally connected with said first mentioned annular member and said link being connected by intermediate links and bell cranks with pivotally mounted levers at the disposal of the pilot.

5. In a helicopter, driving and steering mechanism, comprising a driven propeller shaft, a propeller hub having a back flange, being keyed and slidably mounted on said driven propeller shaft, a plurality of propeller blades swivelly mounted on said propeller hub for variable pitch adjustments, an annular member rotatively mounted on said back flange, means connected with said annular member for adjusting said annular member to various positions for adjusting said propeller hub slidably upon said propeller shaft, a wheel located back of said back flange and having a hub portion fixedly mounted on said propeller shaft and a rim portion universally mounted on said hub portion, a second annular member rotatively mounted on said rim portion of said wheel, a group of flexible links connected with said rim portion and slidably passing through said back flange and connected with said propeller blades for varying the pitches of said blades in accordance with the tilted positions of said rim portion, and means connected with said second annular member for tilting said rim portion, said group of flexible links being characterized by a link for each of said propeller blades.

6. In a helicopter, driving and steering mechanism, comprising a driven propeller shaft, a propeller hub having a back flange, being keyed and slidably mounted on said driven propeller shaft, a plurality of propeller blades swivelly mounted on said propeller hub for variable pitch adjustments, an annular member rotatively mounted on said back flange, means connected with said annular member for adjusting said annular member to various positions for adjusting said propeller hub slidably upon said propeller shaft, a wheel located back of said back flange and having a hub portion fixedly mounted on said propeller shaft and a rim portion universally mounted on said hub portion, a second annular member rotatively mounted on said rim portion of said wheel, a group of flexible links connected with said rim portion and slidably passing through said back flange and connected with said propeller blades for varying the pitches of said blades in accordance with the tilted positions of said rim portion, and means connected with said second annular member for tilting said rim portion, said latter mentioned means comprising oppositely disposed groups of links connected with said second annular member and connected by intermediate links and bell cranks with levers at the disposal of the pilot.

7. In a helicopter, driving and steering mechanism, comprising a driven propeller shaft, a propeller hub having a back flange, being keyed and slidably mounted on said driven propeller shaft, a plurality of propeller blades swivelly mounted on said propeller hub for variable pitch adjustments, an annular member rotatively mounted on said back flange, means connected with said annular member for adjusting said annular member to various positions for adjusting said propeller hub slidably upon said propeller shaft, a wheel located back of said back flange and having a hub portion fixedly mounted on said propeller shaft and a rim portion universally mounted on said hub portion, a second annular member rotatively mounted on said rim portion of said wheel, a group of flexible links connected with said rim portion and slidably passing through said back flange and connected with said propeller blades for varying the pitches of said blades in accordance with the tilted positions of said rim portion, and means connected with said second annular member for tilting said rim portion, said propeller hub being provided for a rear propeller for driving the helicopter in a forward direction and propeller hubs for overhead propellers for raising the helicopter off the ground.

EUGENE ADAMS.